(12) United States Patent
Matsumoto et al.

(10) Patent No.: US 6,262,374 B1
(45) Date of Patent: Jul. 17, 2001

(54) SHIELDED CABLE CONNECTING STRUCTURE

(75) Inventors: Mitsuhiro Matsumoto; Masahiro Deno; Kazuhisa Ishizaki, all of Shizuoka-ken; Toshihiro Hirai, Kanagawa-ken; Yoshihisa Okuhata, Kanagawa-ken; Hiroki Nishi, Kanagawa-ken; Haruki Hamada; Masayoshi Tashiro, both of Ibaraki-ken, all of (JP)

(73) Assignees: Yazaki Corporation, Tokyo (JP); Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/415,505

(22) Filed: Oct. 12, 1999

(30) Foreign Application Priority Data

Oct. 13, 1998 (JP) .................................. 10-291096

(51) Int. Cl.[7] .................................. H02G 15/02
(52) U.S. Cl. .................................. 174/74 R; 174/78
(58) Field of Search .................... 174/74 R, 75 C, 174/78, 84 R, 88 C, 77 R

(56) References Cited

U.S. PATENT DOCUMENTS

| | | | | |
|---|---|---|---|---|
| 3,448,430 | * | 6/1969 | Kelly | 339/143 |
| 3,603,912 | * | 9/1971 | Kelly | 339/89 C |
| 3,833,754 | * | 9/1974 | Philibert | 174/65 SS |
| 4,022,966 | * | 5/1977 | Gajajiva | 174/65 SS |
| 4,090,029 | * | 5/1978 | Lundeberg | 174/51 |
| 4,739,126 | * | 4/1988 | Gutter et al. | 174/65 SS |

FOREIGN PATENT DOCUMENTS

| | | | |
|---|---|---|---|
| 2104306 | * | 3/1983 | (GB) . |
| 9-180824 | | 7/1997 | (JP) . |
| 10-112924 | | 4/1998 | (JP) . |

* cited by examiner

Primary Examiner—Dean A. Reichard
Assistant Examiner—William H Mayo, III
(74) Attorney, Agent, or Firm—Finnegan, Henderson, Farabow, Garrett & Dunner, L.L.P.

(57) ABSTRACT

A connecting structure for a shielded cable having a braid is disclosed. The connecting structure includes a cable insertion hole, a hollow pressure member, a shield connection member, and a hollow bolt. The cable insertion hole includes a female threaded part and a shield connection part having an inclined surface. The hollow pressure member is inserted into the shield connection part of the cable insertion hole and the shielded cable passes through the hollow pressure member. The shield connection member is connected to the braid of the shielded cable and has an inclined part. The shield connection member is inserted into the cable insertion hole such that the inclined part is disposed between the inclined surface of the shield connection part and the hollow pressure member. The shielded cable passes through the hollow bolt and the hollow bolt is threaded into the female threaded part of the cable insertion hole. When the hollow bolt is tightened to press the hollow pressure member, the hollow pressure member in turn presses the inclined part of the shield connection member against the inclined surface of the shield connection part to electrically connect the braid to the cable insertion hole.

10 Claims, 4 Drawing Sheets

SHIELDED CABLE CONNECTING STRUCTURE

BACKGROUND OF THE INVENTION

1. Field of the Invention

The present invention relates to a shielded cable connecting structure applied to various electrical equipment such as motors in an electrical vehicle, and more particularly to a shield cable connecting structure which provides both a shielded connection and waterproofing.

2. Description of the Related Art

When making connections of high-voltage cables to motors or making connections to control signal cables in electrical vehicles, for example, it is necessary to provide both electromagnetic shielding and waterproofness. This electromagnetic shielding is done to avoid unstable motor operation caused by various types of noise, and waterproofing is done to prevent the intrusion of corrosion damage to electrical contact parts by the intrusion of rain moisture into the motor via the shielded cable.

A shielded cable connecting structure that provides electromagnetic shielding and waterproofing is disclosed in the Japanese laid open patent application publication H10-112924, which is illustrated in FIG. 1 and FIG. 2A and 2B. As shown in FIG. 1, the shielded cable connecting structure makes connection to the braid 6a of the shielded cable 6, via a substantially cylindrical housing 3, a bolt 4, and a shield connection ring 5 that serves as a shield connection member within a cable insertion hole 2a in the motor case 2 of the main equipment to which connection is made. That is, the outer peripheral surface 3a of the housing 3 is fitted into the cable insertion hole 2a of the motor case, a mounting flange 3b used for this purpose being held fast by the bolt 4, so that the housing 3 through which the shielded cable 6 is inserted in mounted to the motor case 2.

As shown in FIG. 2A and FIG. 2B, the braid 6a of the shielded cable 6, which is inserted into the housing 3 is folded back onto a peripheral depression at the end of the housing 3, this folded-back braid 6a being sandwiched by the shield connection ring 5 that is fitted over the peripheral depression 3c at the end of the housing 3. This shield connection ring 5 is made of a metal having good resilience, and is formed so to have a gap opening in its center, the folded-back braid 6a of the shielded cable 6 being freely held in place to prevent the pulling out thereof, by a plurality of spring places 3a and a fang piece 5b. Additionally, each of the spring pieces 5a of the shield ring 5 is in resilient contact with the cable insertion hole 2a of the motor case 2. According to this configuration, the braid 6a of the shielded cable 6 is grounded via the motor case 2.

The annular groove 3d formed at the outer peripheral surface 3a of the housing 3 has an O-ring 7 that fitted therein, which provide an intimate seal between the housing 3 and the motor case 2. Additionally, a substantially cylindrically shaped waterproof cover 8 is inserted between the outer insulation covering 6b of the shielded cable 6 and the housing 3. The above-noted O-ring 7 and waterproof cover 8 reliably prevent the intrusion of rain moisture into the motor case 2 from the outside. The shielded cable 6, which is inserted through a corrugated tube 9, is inserted into the cable insertion hole 2a of the housing 2. Additionally, the inner conductor 6d which is exposed from the inner insulation covering 6c of the shielded cable 6 has crimped onto it a connection terminal (not shown in the drawing) that makes connection with a motor terminal (not shown in the drawing).

Art similar the above-noted shielded cable connecting structure is disclosed, for example, in the Japanese laid-open patent application publication H9-180824.

In the above-described shielded cable connecting structure 1, however, because the spring force of the shield connection ring 5 in used to make a connection between the cable insertion hole 2a of the motor case 2 and the braid 6a of the shielded cable 6, fatiguing of the spring characteristics of the shield connection ring 5 with the passage of time and other phenomena lead to the danger of a deterioration of the shielding characteristics Additionally, because the same surface of the cable insertion hole 2a of the motor case 2 serves as the surface that shields the braid 6a and the waterproofing surface that makes contact with the O-ring 7, when mounting the housing 3 to the motor case using the bolt 4, there was a danger of damaging this waterproofing surface, thereby causing a worsening of waterproofness. Additionally, because the housing 3 is mounted to the motor case 2 via the flange 3b and the bolt 4, it is absolutely necessary to provide sufficient space for mounting, thereby causing an increase in size of the overall structure.

Accordingly it is an object of the present invention to solve the problems described above in the related art, by providing a shielded cable connecting structure that provides reliable shield connection and waterproofness, and which also enables an overall savings in space.

SUMMARY OF THE INVENTION

To achieve the above-noted object, a first aspect of the present invention is a shielded cable connecting structure provided with a cable insertion hole, for passage of the shielded cable, at a prescribed position on the equipment to be connected, wherein the braid of a shielded cable passed through this cable insertion hole is connected to a prescribed position of the cable insertion hole, via a shield connection member, this shielded cable connecting structure having a shield connection part and a female thread part inside the shielded cable insertion hole, the shield connection member to which is connected the braid of the shielded cable, via a hollow pressure member through which the shielded cable passes, being connected to the shield connection part, a hollow bolt through which the shielded cable passes being screwed into the female thread of the cable insertion hole, with the tightening of this bolt acting to freely press the shield connection member in the direction that presses it up against the shield connection part of the cable insertion hole.

According to the above-noted shielded cable connecting structure, because the tightening of a hollow bolt through which the shielded cable is passed acts to press a hollow pressure member, thereby causing the shield connection member that is connected to the braid of the shielded cable to make contact with the shield connection part of the cable insertion hole, the shield connection between the equipment and the braid of the shielded cable is reliably made, and shielding performance is improved. Additionally, because a hollow bolt is tightened into a female thread that is provided concentrically with the cable insertion hole of the equipment to which connection is to be made, so as to mike a shield connection between the equipment and the braid of the shielded cable, it is possible to achieve a space savings in the shielded cable connecting structure, thereby making the overall structure more compact.

A second aspect of the present invention is a variation of the first aspect described above, this variation having a shield connection member housing part for housing the shield connection member in the cable insertion hole, an inclined part being provided on the shield connection part side of the boundary between this shield connection member housing part and the shield connection part, an inclined part of the shield connection member being caused to press against this inclined part.

According to the above-noted shielded cable connecting structure, because a hollow pressure member that is pressed by the tightening of the bolt through which the shielded cable passes acts to make a reliable contact between the inclined part of the shield connection member, to which is connected the braid of the shielded cable, and the inclined part of the shield connecting member of the cable insertion hole, the shield connection between the equipment and the braid of the shielded cable is reliably made, and shielding performance is improved.

A third aspect of the present invention is a variation of the second aspect, wherein an annular groove is provided in both the inside peripheral surface and the outer periphery of the hollow pressure member, a sealing member being disposed in each of these inner and outer grooves.

According to the above-noted shielded cable connecting structure, because the inclined part of the shield connection member prevents damage to the sealing surface (waterproofing surface) of the shield connection member when inserting the shielded cable connection member into the cable insertion hole of the equipment, the sealing members disposed in the inner and outer grooves of the hollow pressure member provide reliable waterproofing between the hollow pressure member and the shielded cable, and between the hollow pressure member and the equipment.

DESCRIPTION OF THE PREFERRED EMBODIMENTS

Preferred embodiments of the present invention are described below, with reference being made to relevant accompanying drawings.

Figure 3:
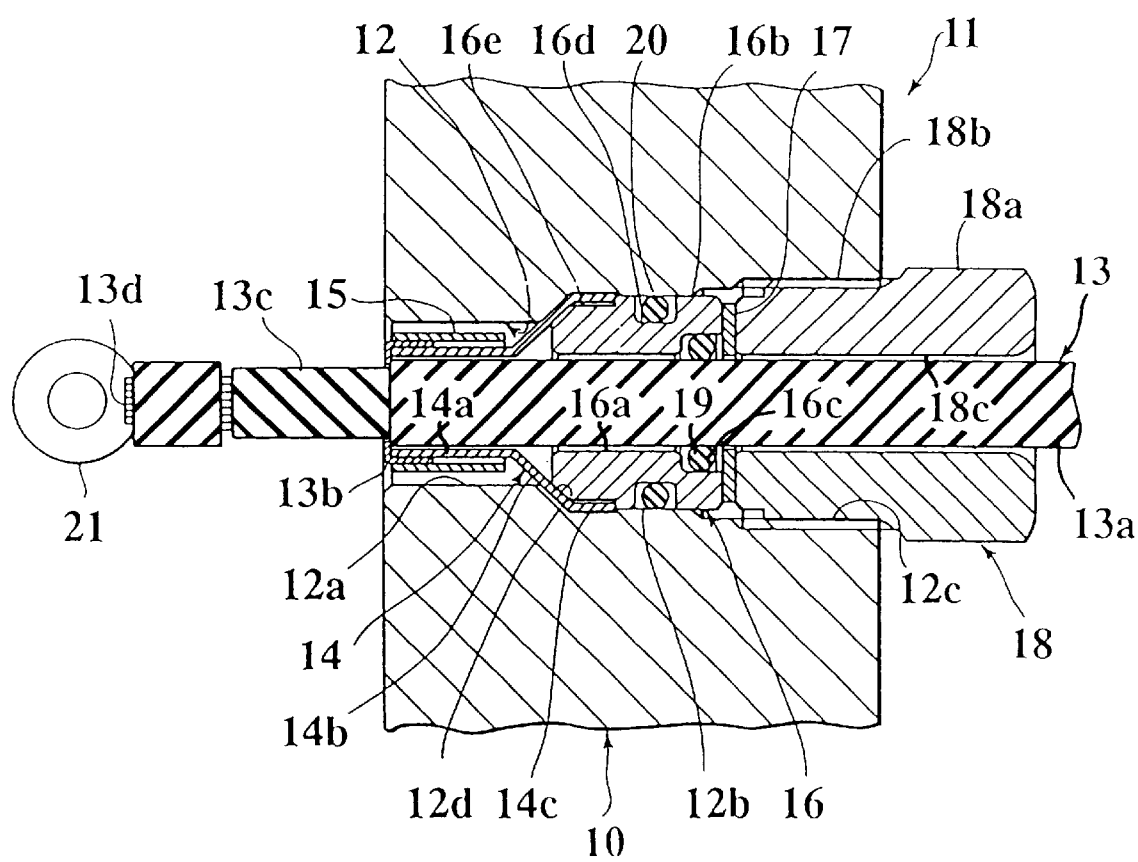
FIG. 3 is a cross-section view showing an embodiment of a shielded cable connecting structure according to the present invention.
Figure 4:
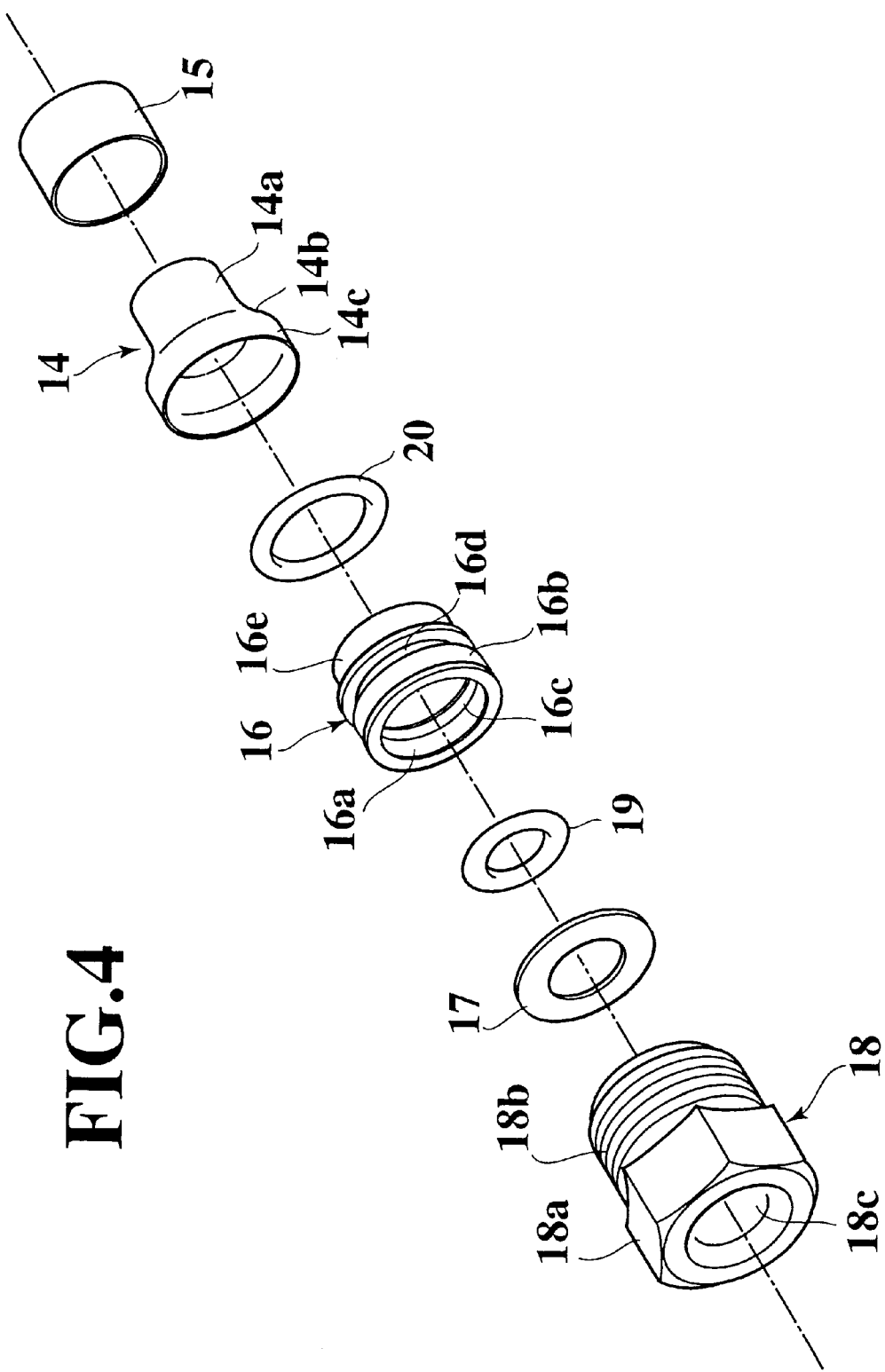
FIG. 4 is an exploded perspective view of the shielded cable connecting structure of FIG. 3.

FIG. 3 is a cross-section view showing an embodiment of a shielded cable connecting structure according to the present invention, and FIG. 4 is an exploded perspective view of the connecting structure of FIG. 3.

Figure 1:
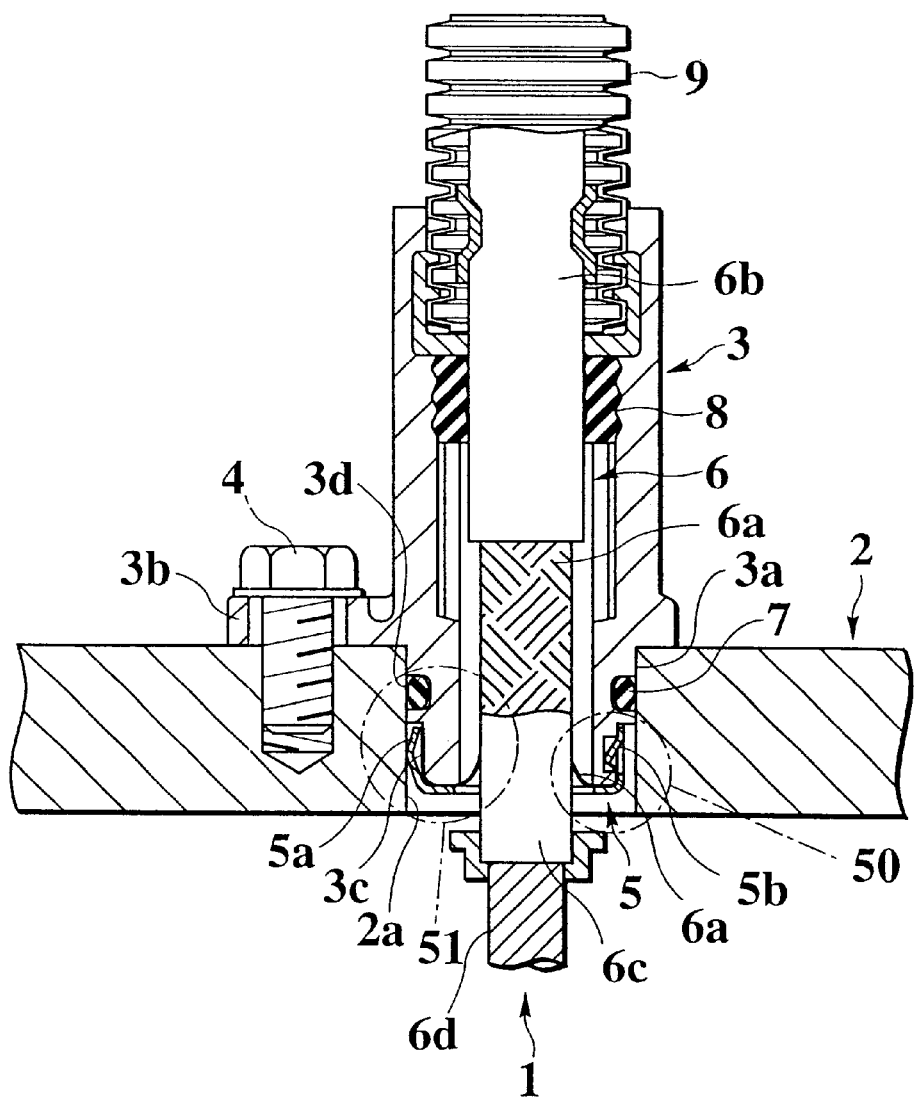
FIG. 1 is a cross-section view showing a shielded cable connecting structure of the past.
Figure 2A:
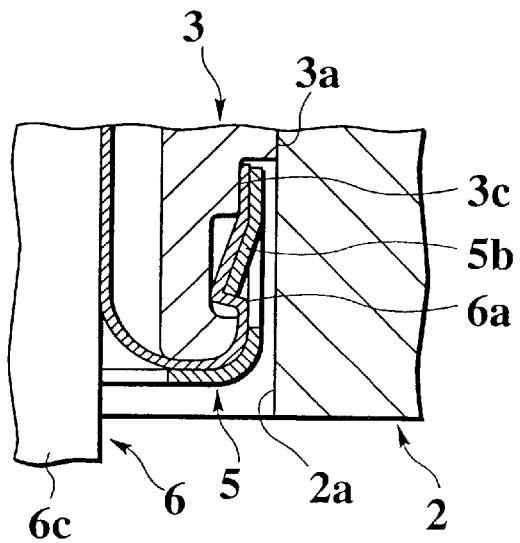
FIG. 2A is an enlarged cross-section view of the area marked 50 in FIG. 1.
Figure 2B:
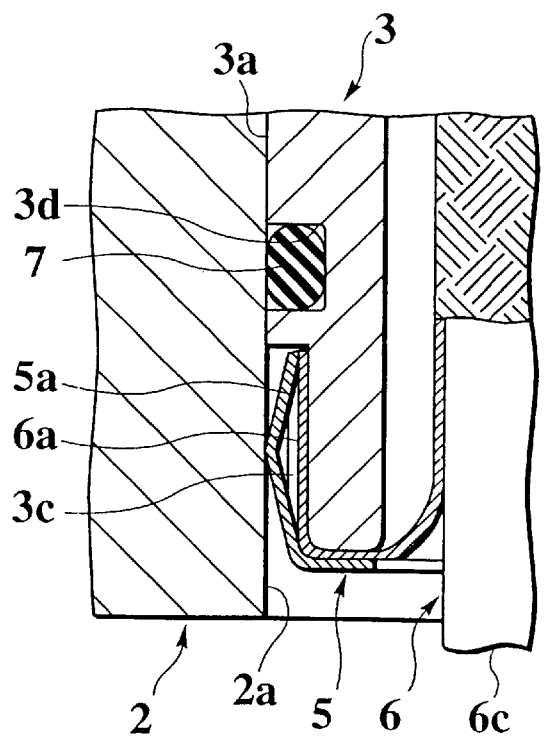
FIG. 2B is an enlarged cross-section view of the area marked 51 in FIG. 1.

The shielded cable connecting structure shown in FIG. 1 is applied to a motor of an electrical vehicle (neither shown in the drawing), for example, and provides both electromagnetic shielding and waterproofing. Specifically in the shielded cable connecting structure 10, a cable insertion hole 12 is formed at a prescribed position of an electrically conductive motor case (equipment) 11. the brain 13b of a shielded cable 13, such as high-voltage supply lead or a control signal line, which is passed through a cable insertion hole, being connected to a prescribed position of the cable insertion hole 12. via an electrically conductive shield terminal (shield connection member) 14. an electrically conductive shield pipe 15, a hollow shield plate (hollow pressure member) 16, a ring 17, and a hollow bolt 18, thereby grounding the shield 13b.

The cable insertion hole 12 is formed so as to pass through the thickness of the material forming the motor case 11, this having a shield connection member housing part 12a for housing the shield terminal 14 and the shield pipe 15, a shield connection part 12b having a larger diameter than the shield connection member housing part 12a and through which the shield plate 16 in inserted, and a female threaded part 12c which has a larger diameter than the shield connection 12b and which mates with the hollow bolt 18. On the shield connection part 12b side of the boundary between the shield connection member housing part 12a and the shield connection part 12b an inclined part 12d is formed as one therewith, this inclined part having a conical surface. This inclined part 12d of the shield connection part 12b makes surface contact with an inclined part 14b of the shield terminal 14, to be described below.

The shield terminal 14 serves to make an electrical connection between the braid 13b of the shielded cable 13 and the motor case 11, and is substantially cylindrical in shape, being formed by the small-diameter cylinder 14a, the conical inclined part 14b, and the large-diameter cylinder 14c. When this shield terminal 14 is inserted into the cable insertion hole 12, the inclined part 14b thereof makes surface contact with the inclined part 12b of the shield connection part 12, and the large-diameter cylinder 14c makes surface contact with the shield connection part 12.

The shield pipe 15 is provided so as to fix the shield terminal 14 and the braid 13b of the shielded cable 13, and is formed cylindrically of an electrically conductive metal having good resilience. That in, the shield pipe 15 is larger in diameter than the small-diameter cylinder 14a of the shield terminal 14, the braid 13b of the shielded cable 13 being folded back between the small-diameter cylinder 14a of the shield terminal 14 and the shield pipe 15 so as to grip and hold the braid therebetween.

The hollow shield plate 16 is provided for the purpose of holding each of the O rings 19 and 20. to be described below, and pressing the shield terminal 14 against the inclined part 12d of the shield connection part 12b of the cable insertion hole 12, this being a substantially cylindrically formed plate. This on one end (the bolt 18 end) of the inner peripheral surface 16a of this shield plate 16 is formed an annular groove 16c with an L-shaped cross-section, and in the approximate center of the outer peripheral surface 16b thereof is formed an annular groove 16d with a rectangular depression when viewed in cross-section. toroidally shaped O-rings (sealing members) 19 and 20 are fitted into these grooves 16c and 16d. The front side of the outer peripheral surface 16b of the shield plate 16 has a depression 16e that has a smaller diameter than the outer peripheral surface 16b, this fitting into the large-diameter part 14c of the shield terminal 14.

The inner O-ring 19 is provided for the purpose of providing waterproofing between the shield plate 16 and the shielded cable 13, and is formed as a toroidally shaped rubber member. The O-ring 19 is pressed against by the flat annular ring 17, so that it does not fall out of place. When the bolt 18 Is tightened, this ring 17 serves to prevent direct torsional force from being applied to the O-ring 19. Additionally, the outer O-ring 20 is provided for the purpose of providing waterproofing between the shield plate 16 and the cable insertion hole 12 of the motor case 11, and is formed as a toroidally shaped rubber member.

The hollow bolt 18 has a hexagonal head 18a and a shank 18b, which is threaded into the female threaded part 12c of the cable insertion hole 12, outer insulation covering 13a of the shielded cable 13 being inserted within the inner peripheral surface 18c thereof. A crimp-on terminal 21 that is connected to the motor terminal part (not shown in the drawing) is crimped onto the center conductor 13d that is exposed from the inner insulation covering 13c of the shielded cable 13.

According to the above-described embodiment of a shielded cable connecting structure 10, the braid 13b of the shielded cable 13 is folded back onto the small-diameter cylinder 14a of the shield terminal 14, and crimped by the shield pipe 15. The shield terminal 14 is then inserted into the cable insertion hole 12 of the motor case 11 from the female threaded part 12c side, as are the shield plate 16 and the ring 17, after which the shank 18b of the hollow bolt 18, through which the shielded cable 13 has been inserted, is threaded into the female threaded part 12c of the cable insertion hole 12 When the hollow bolt 18 is tightened, the tightening force of the hollow bolt 18 in the axial direction presses the inclined part 14b of the shield _terminal 14 up against the conically shaped inclined part 12d of the shield connection part 12b of the cable insertion hole 12, thereby causing secure contact between the motor case 11 and the shield terminal 14 that is connected to the braid 13b of the shielded cable 13. When this is done, the inner and outer b-rings 19 and 20 that are fitted into the grooves in the shield plate 16 provide secure waterproofing between the motor case 11 and the shielded cable 13.

In this manner, by tightening the hollow bolt 18, through which the shielded cable 13 is passed, so as to press on the ring 17 and the shield plate 16, the inclined part 14b of the shield terminal 14, to which the braid 13b of the shielded cable 13 is connected, is brought into secure contact with the inclined part 12d of the shield connection part 12b of the cable insertion hole 12, the result being a reliable shield connection between the motor case 11 and the braid 13b of the shielded cable 13, and a further improvement in the shielding performance.

Additionally, by tightening the hollow bolt 18 into the female threaded part 12c of the cable insertion hole 12 of the motor case 11, so that a shield connection is made by the braid 13b of the shielded cable 13 and the motor case 11, it in possible to reduce the space of the shielded cable connecting structure, thereby enabling a further reduction in overall size.

Additionally, win inserting the shield terminal 14 into the cable insertion hole 12, the inclined part 14b of the shield terminal 14 prevents damage to the sealing surfaces of the shield connection part of the cable insertion hole 12, so that the rubber O-rings 19 and 20 that are fitted into the grooves 16c and 16d, respectively at the inner and outer peripheral surfaces 16a and 16 of the shield plate are able to provide secure waterproofing between the shield plate 16 and the shielded cable 13, and between the shield plate 16 and the cable insertion hole 12 of the motor case 11.

While the above-noted embodiment of the present invention was described for the case in which toroidally shaped rubber O-rings are used as the sealing members, the present invention is not restricted in this manner, it being possible to use, for example, a resilient member having a conical cross-section.

As described in detail above, according to the first embodiment of the present invention, because the tightening of a hollow bolt through which the shielded cable is passed acts to press a hollow pressure member, thereby causing the shield connection member that is connected to the braid of the shielded cable to make contact with the shield connection part of the cable insertion hole, the shield connection between the equipment and the braid of the shielded cable is reliably made, and shielding performance is improved. Additionally, because a hallow bolt is tightened into a female thread that is provided concentrically with the cable insertion hole of the equipment to which connection is to be made, so as to make a shield connection between the equipment and the braid of the shielded cable, it is possible to achieve a space savings in the shielded cable connecting structure, thereby making the overall structure more compact.

According to another embodiment of a shielded cable connecting structure, recited in claim 2 of the attached claims, because a hollow pressure member that is pressed by the tightening of the bolt through which the shielded cable passes acts to make a reliable contact between the inclined part of the shield connection member, to which is connected the braid of the shielded cable, and the inclined part of the shield connecting member of the cable insertion hole, the shield connection between the equipment and the braid of the shielded cable is reliably made, and shielding performance is improved.

According to yet another embodiment of a the above-noted shielded cable connecting structure, recited in claim 3 of the attached claims, because the inclined part of the shield connection member prevents damage to the sealing surface of the shield connection member when inserting the shielded cable connection member into the cable insertion hole of the equipment, the sealing members disposed in the inner and outer grooves of the hollow pressure member provide reliable waterproofing between the hollow pressure member and the shielded cable, and between the hollow pressure member and the equipment

What is claimed it:

1. A connecting structure for a shielded cable having a braid, comprising:
    a cable insertion hole including a female threaded part and a shield connection part having an inclined surface;
    a hollow pressure member having the shielded cable passing therethrough, the hollow pressure member being inserted into the shield connection part of the cable insertion hole;
    a shield connection member connected to the braid of the shielded cable and having an inclined part, the shield connection member being inserted into the cable insertion hole such that the inclined part is disposed between the inclined surface cf the shield connection part and the hollow pressure member; and
    a hollow bolt having the shielded cable passing therethrough, the hollow bolt being threaded into the female threaded part of the cable insertion hole so that when the hollow bolt is tightened to press the hollow pressure member, the hollow pressure member in turn presses the inclined part of the shield connection member against the inclined surface of the shield connection part to electrically connect the braid to the cable insertion hole.

2. The connection structure according to claim 1, wherein the cable insertion hole further includes a shield connection member housing part having a first surface and the shield connection part further includes a second surface larger than the first surface, the first and second surfaces being connected by the inclined surface.

3. The connection structure according to claim 2, wherein the shield connection member includes a first cylinder disposed within the shield connection member housing part and a second cylinder larger than the first cylinder, the first and second cylinders being connected by the inclined part.

4. The connection structure according to claim 3, further comprising a shield pipe fitted around the first cylinder of the shield connection member to hold the braid therebetween.

5. The connection structure according to claim 3, wherein the hollow pressure member includes a depression to accommodate the second cylinder of the shield connection member between the second surface of the shield connection part and the hollow pressure member.

6. The connection structure according to claim 1, wherein the hollow pressure member includes an annular groove disposed on an outer surface thereof and a sealing member disposed in the annular groove to seal the shield connection part and the hollow pressure member.

7. The connection structure of claim 6, wherein the hollow member further includes an L-shaped annular groove disposed on an inner surface thereof and a sealing member disposed in the L-shaped groove to seal the shielded cable and the hollow pressure member.

8. The connection structure of claim 7, wherein the sealing members are o-rings.

9. The connection structure of claim 7, wherein the sealing members have conical cross sections.

10. The connection structure of claim 7, further comprising a ring disposed between the hollow pressure member and the hollow bolt, the ring contacting the sealing member disposed in the L-shaped groove to prevent a torsional force from being directly applied thereto when the hollow bolt is tightened.

* * * * *